(12) United States Patent
Kanno

(10) Patent No.: US 10,761,977 B2
(45) Date of Patent: *Sep. 1, 2020

(54) MEMORY SYSTEM AND NON-TRANSITORY COMPUTER READABLE RECORDING MEDIUM

(71) Applicant: Toshiba Memory Corporation, Minato-ku, Tokyo (JP)

(72) Inventor: Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 16/129,204

(22) Filed: Sep. 12, 2018

(65) Prior Publication Data

US 2019/0026223 A1    Jan. 24, 2019

Related U.S. Application Data

(63) Continuation of application No. 14/656,496, filed on Mar. 12, 2015, now Pat. No. 10,102,118.

(Continued)

(30) Foreign Application Priority Data

Feb. 17, 2015    (JP) ................. 2015-028419

(51) Int. Cl.
*G06F 12/00*    (2006.01)
*G06F 12/02*    (2006.01)

(52) U.S. Cl.
CPC .. *G06F 12/0246* (2013.01); *G06F 2212/7205* (2013.01)

(58) Field of Classification Search
CPC ............... G06F 12/0246; G06F 2212/7205
See application file for complete search history.

(56) References Cited

U.S. PATENT DOCUMENTS

2007/0180208 A1    8/2007 Yamasaki
2007/0211530 A1    9/2007 Nakano
(Continued)

FOREIGN PATENT DOCUMENTS

| JP | 2007-242163 A | 9/2007 |
|----|---------------|--------|
| JP | 2011-28793 A  | 2/2011 |
| JP | 2013191174 A  | 9/2013 |

OTHER PUBLICATIONS

Radu Stoica, Anastasia Ailamaki, "Improving Flash Write Performance by Using Update Frequency", Aug. 26-30, 2013, Proceeding of the VLDB Endowment, vol. 5, No. 9, pp. 733-744.

*Primary Examiner* — Arvind Talukdar
(74) *Attorney, Agent, or Firm* — White & Case LLP

(57) ABSTRACT

According to one embodiment, a memory system includes a nonvolatile memory, configuration unit, address translation unit, write unit and control unit. The configuration unit assigns write management areas included in a nonvolatile memory to spaces and an input space. The write management area is a unit of an area which manages the number of write. The address translation unit associates a logical address of write data with a physical address which indicates a position of the write data in the nonvolatile memory. The write unit writes the write data to the input space and then writes the write data in the input space to a space corresponding to the write data amongst the spaces. The control unit controls the spaces individually with respect to the nonvolatile memory.

9 Claims, 10 Drawing Sheets

Related U.S. Application Data

(60) Provisional application No. 62/072,799, filed on Oct. 30, 2014.

(56) References Cited

U.S. PATENT DOCUMENTS

| | | |
|---|---|---|
| 2011/0019470 A1 | 1/2011 | Shibata et al. |
| 2011/0099349 A1 | 4/2011 | Yano et al. |
| 2011/0283049 A1 | 11/2011 | Kang et al. |
| 2012/0005435 A1 | 1/2012 | Emaru et al. |
| 2012/0137057 A1* | 5/2012 | Ito ................. G06F 12/0246 711/103 |
| 2012/0151124 A1 | 6/2012 | Baek et al. |
| 2012/0311293 A1 | 12/2012 | Nemazie et al. |
| 2013/0246688 A1 | 9/2013 | Kanno et al. |
| 2013/0311712 A1 | 11/2013 | Aso |
| 2014/0032817 A1 | 1/2014 | Bux et al. |
| 2015/0178194 A1 | 6/2015 | Shaharabany et al. |
| 2017/0228173 A9 | 8/2017 | Hussain et al. |

* cited by examiner

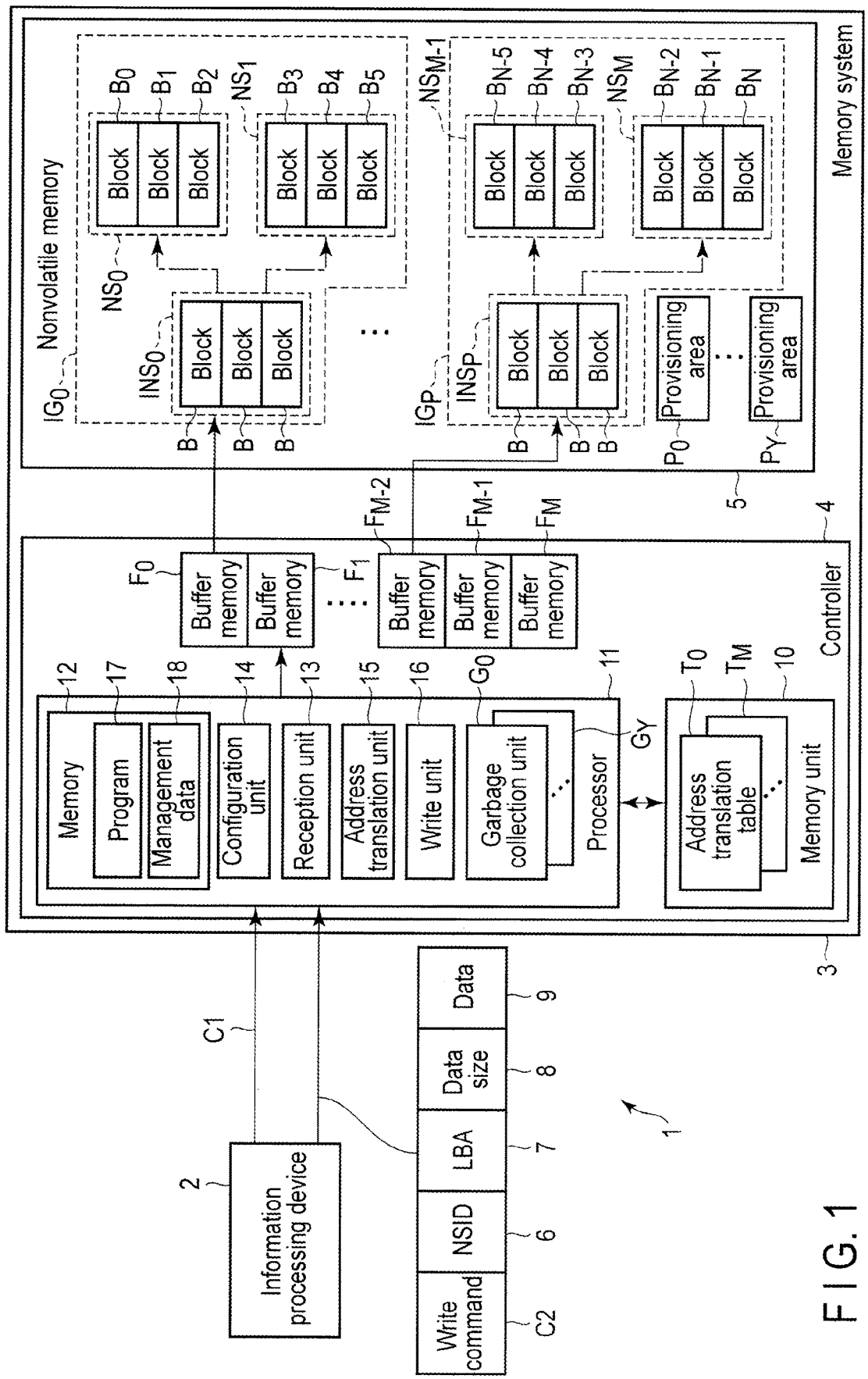
F I G. 1

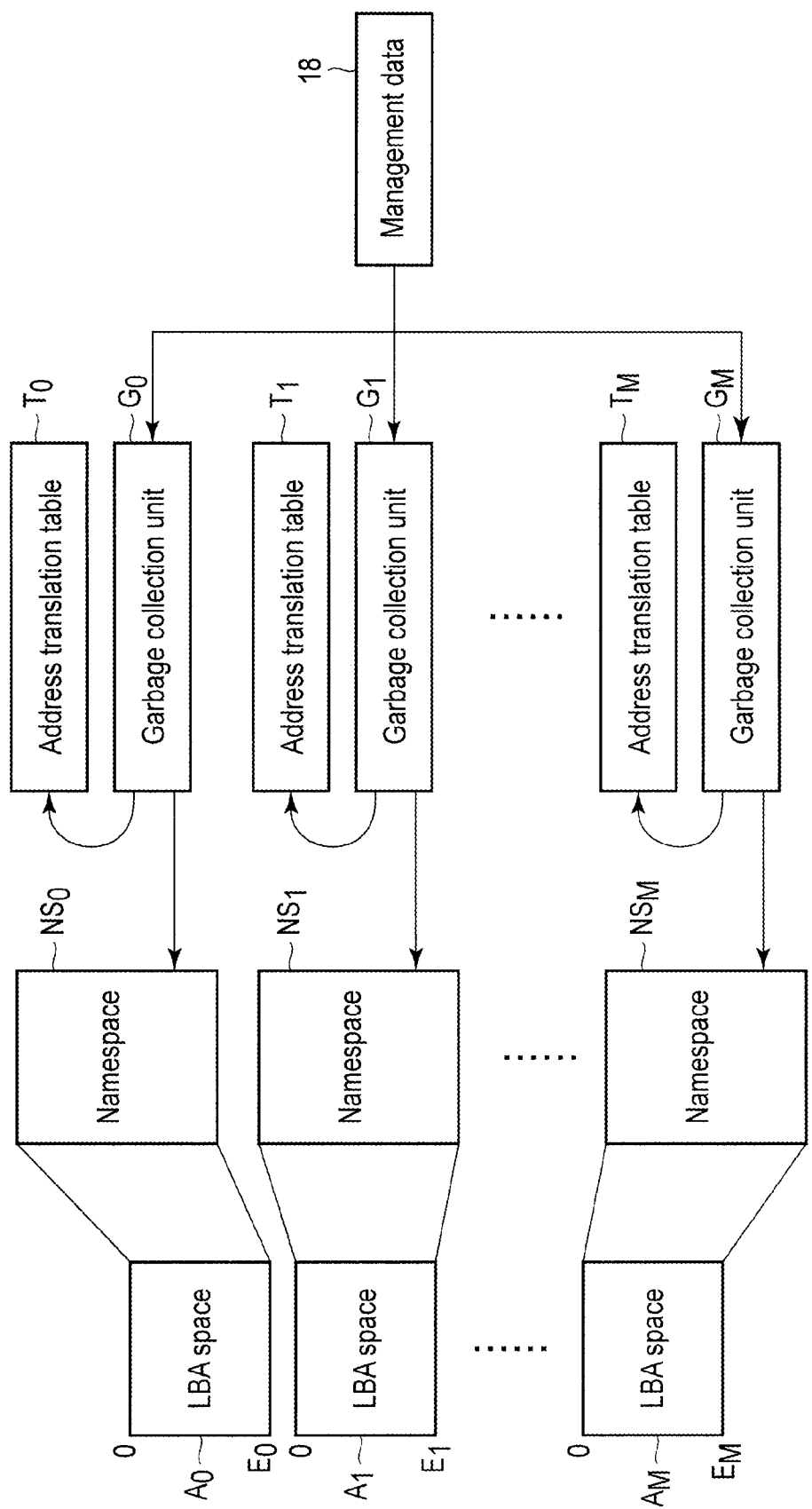
F I G. 2

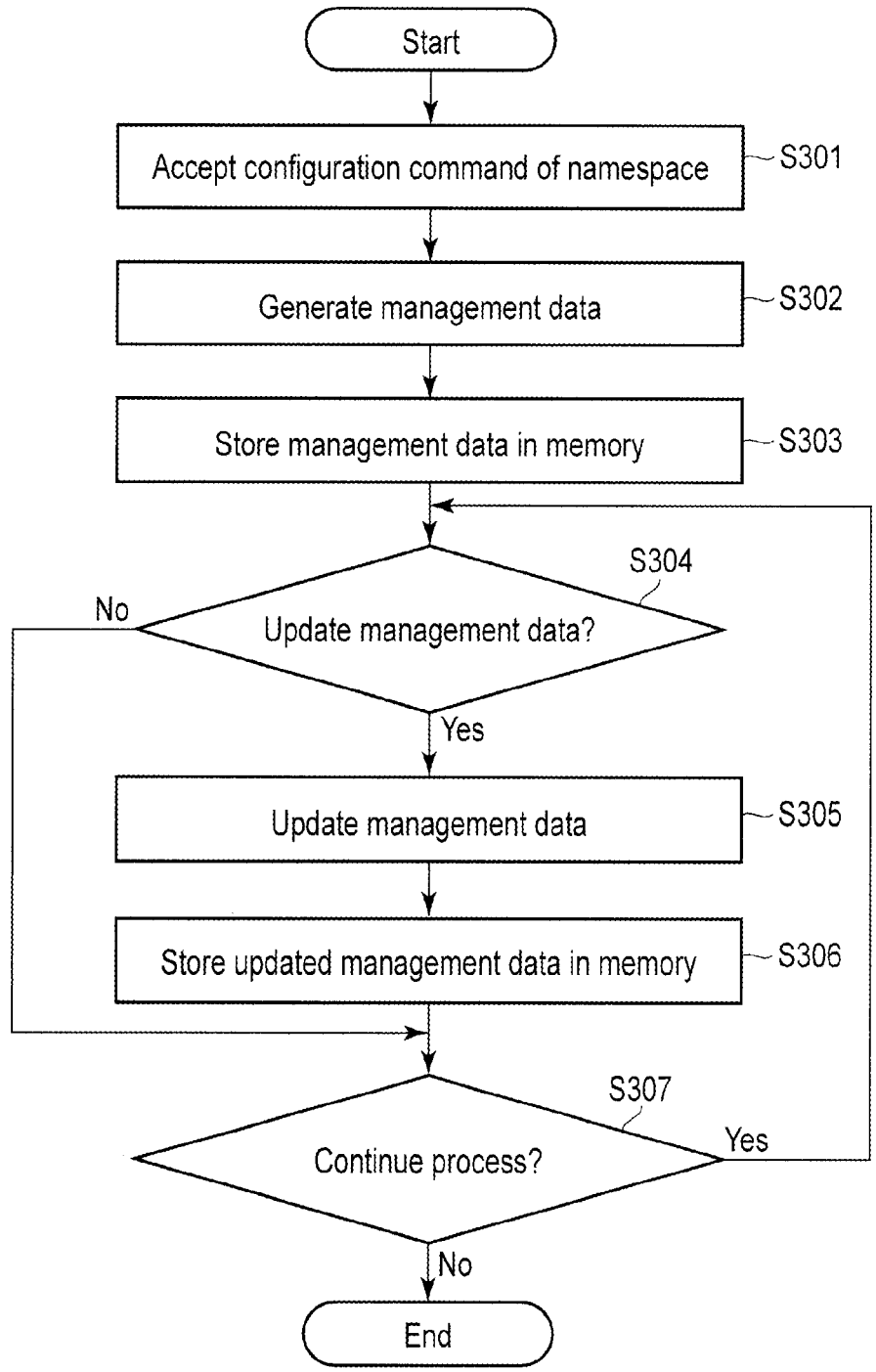
F I G. 3

| LBA | PBA | Namespace | Data size | Input flag |
|---|---|---|---|---|
| LBA200 | PBA300 | $NS_0$ | Z | N |
| LBA201 | PBA301 | $NS_0$ | Z | Y |
| ⋮ | ⋮ | ⋮ | ⋮ | ⋮ |
| LBA200 | PBA399 | $NS_M$ | Z | N |
F I G. 6
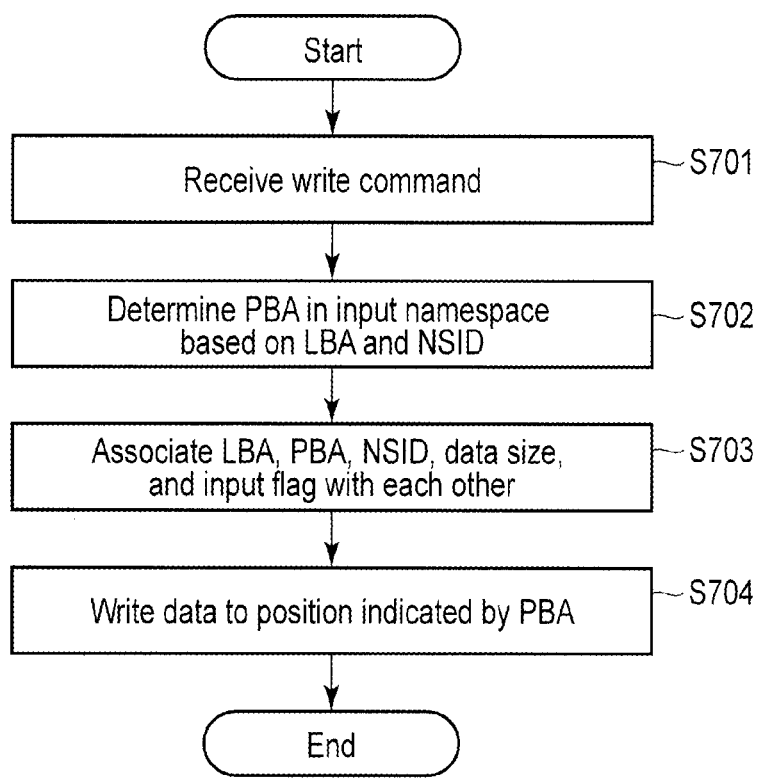
F I G. 7

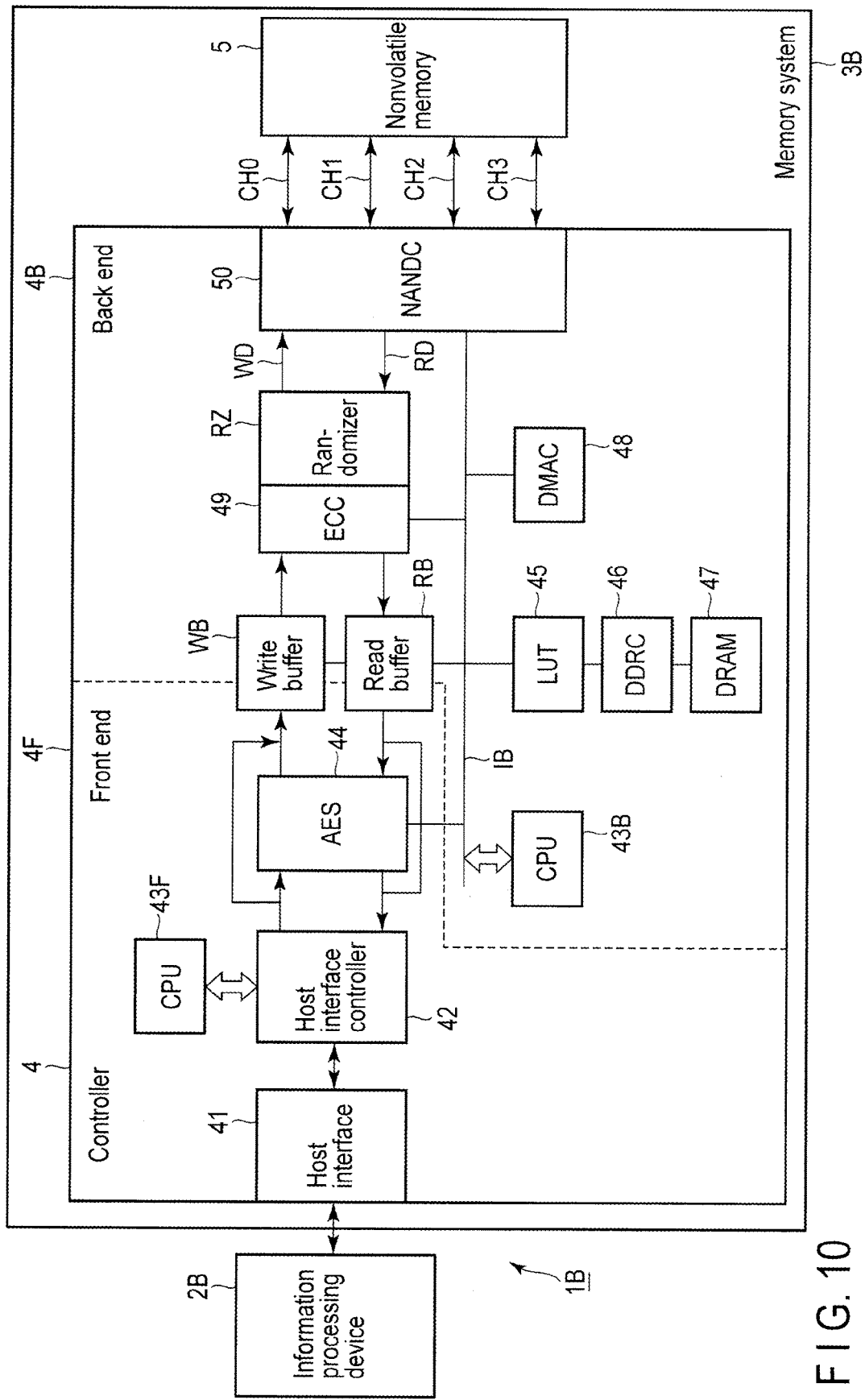
F I G. 10

MEMORY SYSTEM AND NON-TRANSITORY COMPUTER READABLE RECORDING MEDIUM

CROSS-REFERENCE TO RELATED APPLICATIONS

This application is a continuation of application Ser. No. 14/656,496, filed Mar. 12, 2015 and is based upon and claims the benefit of priority from U.S. Provisional Application No. 62/072,799, filed Oct. 30, 2014; and Japanese Patent Application No. 2015-028419, filed Feb. 17, 2015, the entire contents of all of which are incorporated herein by reference.

FIELD

Embodiments described herein relate generally to a memory system and a non-transitory computer readable recording medium.

BACKGROUND

A solid state drive (SSD) includes a nonvolatile semiconductor memory and has an interface which is similar to that of a hard disk drive (HDD). For example, at the time of data writing, the SSD receives a write command, logical block addressing (LBA) of a writing destination, and write data from an information processing device, translates the LBA into physical block addressing (PBA) based on a lookup table (LUT), and writes the write data to a position indicated by the PBA.

BRIEF DESCRIPTION OF THE DRAWINGS

FIG. 1 is a block diagram showing an example of a structure of an information processing system according to a first embodiment;

FIG. 2 is a block diagram showing an example of a relationship between LBA spaces, namespaces, address translation tables, garbage collection units, and management data;

FIG. 3 is a flowchart showing an example of a process performed by a reception unit and a configuration unit according to the first embodiment;

FIG. 6 is a data structural diagram showing an example of a translation table according to the second embodiment;

FIG. 7 is a flowchart showing an example of a first write process of a memory system according to the second embodiment;

FIG. 10 is a block diagram showing an example of a structure of an information processing system according to a third embodiment.

DETAILED DESCRIPTION

Figure 4:
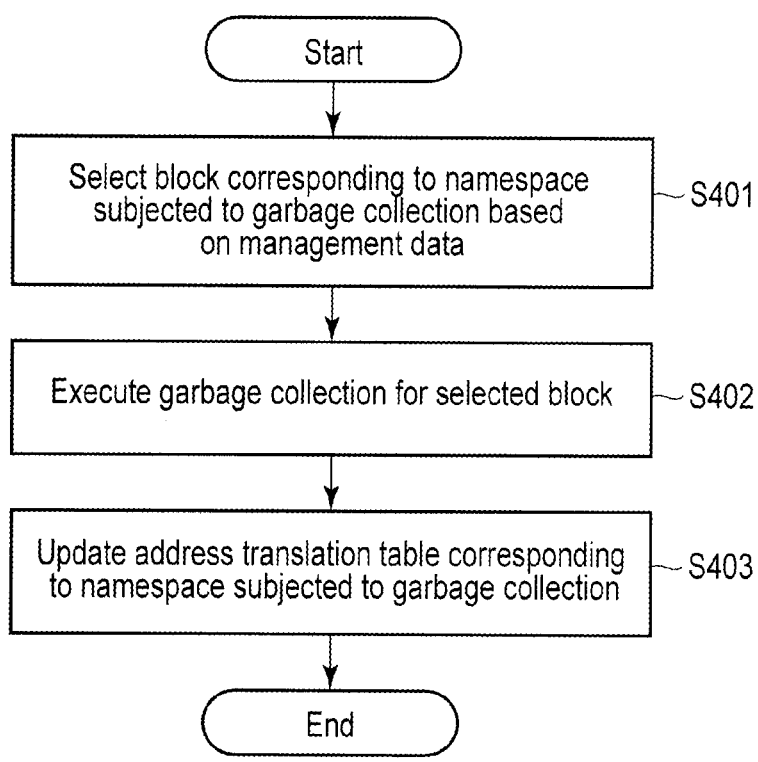
FIG. 4 is a flow chart showing an example of a process performed by a garbage collection unit and an address translation unit according to the first embodiment.

In general, according to one embodiment, a memory system includes a nonvolatile memory, configuration unit, address translation unit, write unit and control unit. The configuration unit assigns write management areas included in a nonvolatile memory to spaces and an input space. The write management area is a unit of an area which manages the number of write. The address translation unit associates a logical address of write data with a physical address which indicates a position of the write data in the nonvolatile memory. The write unit writes the write data to the input space and then writes the write data in the input space to a space corresponding to the write data amongst the spaces. The control unit controls the spaces individually with respect to the nonvolatile memory.

Embodiments will be described hereinafter with reference to drawings. In a following description, the same reference numerals denote components having nearly the same functions and arrangements, and a repetitive description thereof will be given if necessary. In the following embodiments, access means both data reading and data writing.

First Embodiment

FIG. 1 is a block diagram showing an example of a structure of an information processing system according to the present embodiment.

An information processing system 1 includes an information processing device 2 and a memory system 3. The information processing system 1 may include a plurality of information processing device 2. A case where the information processing system 1 includes a plurality of information processing device 2 is explained later in a second embodiment.

The memory system 3 is, for example, an SSD, and includes a controller 4 and a nonvolatile memory 5. The memory system 3 may be included in the information processing device 2, and the information processing device 2 and the memory system 3 may be connected through a network in a data communicative manner.

In the present embodiment, at least one NAND flash memory is used as the nonvolatile memory 5. However, the present embodiment can be applied to various nonvolatile memories including a plurality of write management areas, and such various nonvolatile memories may be, for example, a NOR flash memory, magnetoresistive random access memory (MRAM), phase change random access memory (PRAM), resistive random access memory (ReRAM), and ferroelectric random access memory (FeRAM). Here, the write management area is an area of a unit which manages the number of writes. The nonvolatile memory 5 may include a three dimensional memory.

For example, the nonvolatile memory 5 includes a plurality of blocks (physical blocks). The plurality of blocks include a plurality of memory cells arranged at crossing points of word lines and bit lines. In the nonvolatile memory 5, data are erased at once block by block. That is, a block is an area of a unit of data erase. Data write and data read are performed page by page (word line by word line) in each block. That is, a page is an area of a unit of data write or an area of a unit of data read.

In the present embodiment, the number of writes is managed block by block.

The information processing device 2 is a host device of the memory system 3. The information processing device 2 sends a configuration command C1 to the memory system 3.

The configuration command C1 is a command for associating the blocks of the nonvolatile memory 5 with a space. The space includes at least one block.

In the following description, the space will be explained as a namespace.

Furthermore, the information processing device 2 sends a write command C2 together with namespace identification data (NSID) 6, LBA 7 which indicates a writing destination, data size 8 of the write data, and write data 9 to the memory system 3.

In the present embodiment, a plurality of namespaces $NS_0$ to $NS_M$ (M is an integer which is 1 or more) are each space which can be obtained from dividing a plurality of blocks $B_0$ to $B_N$ (N is an integer which is M or more) included in the nonvolatile memory 5. In the present embodiment, the namespace $NS_0$ includes the blocks $B_0$ to $B_2$, and the namespace $NS_M$ includes the blocks $B_{N-2}$ to $B_N$. As with the namespaces $NS_0$ and $NS_M$, the namespaces $NS_1$ to $NS_{M-1}$ includes blocks $B_3$ to $B_{N-3}$.

Furthermore, in the present embodiment, the namespaces $NS_0$ to $NS_M$ are divided into a plurality of input groups $IG_0$ to $IG_P$ (P is an integer which is 1 or more). Note that the namespaces $NS_0$ to $NS_M$ may not be divided and be handled as one input group.

The input group $IG_0$ includes the namespaces $NS_0$ and $NS_1$ and the input group $IG_P$ includes the namespaces $NS_{M-1}$ to $NS_M$. The other input groups $IG_1$ to $IG_{P-1}$ are the same as the input groups $IG_0$ and $IG_P$.

Furthermore, the input groups $IG_0$ to $IG_P$ include input namespaces $INS_0$ to $INS_P$, respectively.

The input namespaces $INS_0$ to $INS_P$ include three blocks B, respectively. However, the number of blocks B included in the input namespace $INS_0$ is not limited to three, and may be one or more.

Hereinafter, the input group $IG_0$ including the namespaces $NS_0$ and $NS_1$ is used to explain the input namespace $INS_0$.

The input namespace $INS_0$ stores the write data 9 with respect to the namespaces $NS_0$ and $NS_1$. In the present embodiment, the input namespace $INS_0$ does not store data from the namespaces $NS_0$ and $NS_1$. The input namespace $INS_0$ may move the data between the blocks within the input namespace $INS_0$.

The data corresponding to the namespace $NS_0$ stored in the input namespace $INS_0$ is stored in the namespace $NS_0$ after performing a garbage collection with respect to the namespace $NS_0$. The data corresponding to the namespace $NS_1$ stored in the input namespace $INS_0$ is stored in the namespace $NS_1$ after performing a garbage collection with respect to the namespace $NS_1$.

Note that, in the present embodiment, the assignment relationship between the namespaces $NS_0$ to $NS_M$ and the blocks $B_0$ to $B_N$, the assignment relationship between the input namespaces $INS_0$ to $INS_P$ and the blocks B, and the assignment relationship between the namespaces $NS_0$ to $NS_M$ and the input namespaces $INS_0$ to $INS_P$ are merely examples, and the number of blocks to be assigned to a single namespace, the number of blocks assigned to a single input namespace, the number of namespaces assigned to a single input group can be changed arbitrarily. For example, the input namespaces $INS_0$ to $INS_P$ assigned to each of the namespaces $NS_0$ to $NS_M$ can be selected optionally. The number of blocks can be different between the namespaces $NS_0$ to $NS_M$ and the number of blocks can be different between the input namespaces $INS_0$ to $INS_P$.

The controller 4 includes a memory unit 10, buffer memories $F_0$ to $F_M$, and a processor 11.

The memory unit 10 stores address translation tables (address translation data) $T_0$ to $T_M$ corresponding to their respective namespaces $NS_0$ to $NS_M$. For example, the memory unit 10 may be used as a work memory. The memory unit 10 may be a volatile memory such as dynamic random access memory (DRAM) or static random access memory (SRAM), or may be a nonvolatile memory. The memory unit 10 may be a combination of a volatile memory and a nonvolatile memory.

The address translation tables $T_0$ to $T_M$ are table data associating LBAs with PBAs with respect to the input namespaces $INS_0$ to $INS_P$ and the namespaces $NS_0$ to $NS_M$, and the address translation tables $T_0$ to $T_M$ may be LUTs, for example. Note that a part of or the whole address translation tables T0 to TM may be stored in a different memory such as memory 12.

Each of the buffer memories $F_0$ to $F_M$ stores the write data until a data amount becomes suitable based on the data write with respect to the namespaces $NS_0$ to $NS_M$. In the present embodiment, the buffer memories $F_0$ to $F_M$ are included in each of the namespaces $NS_0$ to $NS_M$. However, the buffer memories may be included in each of the input namespaces $INS_0$ to $INS_P$. In that case, the number of buffer memories can be reduced.

The processor 11 includes a memory 12, reception unit 13, configuration unit 14, address translation unit 15, write unit 16, and garbage collection unit $G_0$ to $G_Y$.

The memory 12 stores a program 17 and management data 18. In the present embodiment, the memory 12 is included in the processor 11; however, it may be provided outside the processor 11. The memory 12 is, for example, a nonvolatile memory. Note that a part of or the whole program 17 and management data 18 may be stored in a different memory such as the memory unit 10.

The program 17 is, for example, a firmware. The processor 11 executes the program 17 to function as the reception unit 13, configuration unit 14, address translation unit 15, write unit 16, and garbage collection units $G_0$ to $G_Y$.

The management data 18 indicates a relationship between the namespaces $NS_0$ to $NS_M$ and the blocks $B_0$ to $B_N$, a relationship between the input namespaces $INS_0$ to $INS_P$ and the blocks B, and a relationship between the namespaces $NS_0$ to $NS_M$ and input namespaces $INS_0$ to $INS_P$ (the input groups $D_0$ to $D_P$). Referring to the management data 18, which block is in which namespace or input namespace, and which input namespace is assigned to which namespace can be determined.

Furthermore, in the present embodiment, the management data 18 includes various data such as a relationship between data stored in the input namespace $INS_0$ to $INS_P$ and the namespaces $NS_0$ to $NS_M$ corresponding to the data, a data mount of each of the namespaces $NS_0$ to $NS_M$ related to the data stored in input namespaces $INS_0$ to $INS_P$, a writable data amount for each of the namespaces $NS_0$ to $NS_M$, a maximum writable data amount for each of the namespaces $NS_0$ to $NS_M$, write time data of the blocks B included in the input namespaces $INS_0$ to $INS_P$ (time executing write), data amount of valid data of each block B included in the input namespaces $INS_0$ to $INS_P$.

In the present embodiment, the data amount may be represented as, for example, a data size or a block size. When the data size of each data is the same, the data amount may be represented as the number of data items, or the number of blocks.

The reception unit 13 receives, from the information processing device 2, the configuration command C1 to associate each block with each namespace in the nonvolatile memory 5. Furthermore, the reception unit 13 receives, from the information processing device 2, the write command C2, NSID6, LBA7, data size 8, and data 9.

In the following description, a case where the write commend C2 is with the NSID6 which represents the namespace $NS_0$ is explained for the sake of simplification. However, the write command C2 can be with the NSID which represents the other namespaces $NS_1$ to $NS_M$.

When the reception unit 13 receives the configuration command C1 of the namespace, the configuration unit 14 assigns the blocks $B_0$ to $B_N$ to the namespaces $NS_0$ to $NS_M$, assigns the blocks B to the input namespaces $INS_0$ to $INS_P$, the namespaces $NS_0$ to $NS_M$ to the input namespaces $INS_0$ to $INS_P$, and sets the input groups $IG_0$ to $IG_P$.

The assignment of the blocks $B_0$ to $B_N$ to the namespaces $NS_0$ to $NS_M$ may be performed by the configuration unit 14 observing data storage conditions of the namespaces $NS_0$ to $NS_M$ in such a manner that the data capacities, access frequencies, write frequencies, the numbers of accesses, the numbers of writes, or data storage ratios are set to the same level between the namespaces $NS_0$ to $NS_M$. Or, the assignment may be performed based on an instruction from the information processing device 2, or an instruction from the manager of the memory system 3.

The data capacity here is a writable data size, the access frequency or the write frequency is the number of accesses or the number of writes per unit time, and the data storage ratio is a value which indicates a ratio of an area size which the data is already stored with respect to an area size.

Then the configuration unit 14 generates the management data 18 including various data such as data of the namespaces $NS_0$ to $NS_M$ assigned to the blocks $B_0$ to $B_N$, data of the input namespaces $INS_0$ to $INS_P$ assigned to the blocks B, data of the namespaces $NS_0$ to $NS_M$ assigned to the input namespaces $INS_0$ to $INS_P$, data indicative of a relationship between data stored in the input namespace $INS_0$ to $INS_P$ and the namespaces $NS_0$ to $NS_M$ corresponding to the data, a data mount of each of the namespaces $NS_0$ to $NS_M$ related to the data stored in the input namespaces $INS_0$ to $INS_P$, a writable data amount for each of the namespaces $NS_0$ to $NS_M$, a maximum writable data amount for each of the namespaces $NS_0$ to $NS_M$, write time data of the blocks included in the input namespaces $INS_0$ to $INS_P$, and data amount of valid data of each block B in the input namespaces $INS_0$ to $INS_P$, and stores the management data 18 in the memory 12.

For example, each time when data is written to the input namespaces $INS_0$ to $INS_P$, the configuration unit 14 acquires a data amount of data for each of the namespaces $NS_0$ to $NS_M$ stored in the input namespaces $INS_0$ to $INS_P$. Then, the configuration unit 14 subtracts the acquired data amount of data for each of the namespaces $NS_0$ to $NS_M$ stored in the input namespaces $INS_0$ to $INS_P$ from a predetermined data amount corresponding to the namespace $NS_0$ to $NS_M$, and assigns the number of blocks corresponding to a result of subtraction to the namespaces $NS_0$ to $NS_M$.

For example, the configuration unit 14 manages information indicative of a relationship between the namespaces $NS_0$ to $NS_M$ and a data amount of data for each of the namespaces $NS_0$ to $NS_M$ stored in the input namespaces $INS_0$ to $INS_P$ with the management data 18.

For example, the configuration unit 14 selects a data transfer source block (which may be referred to as "data transfer target block") from the blocks B included in the input namespaces $INS_0$ to $INS_P$. When valid data stored in the data transfer source block and corresponding to the namespaces $NS_0$ to $NS_M$ is transferred to a block of the namespaces $NS_0$ to $NS_M$ associated with the valid data, the configuration unit 14 subtracts a data amount of the valid data transferred to the namespaces $NS_0$ to $NS_M$ from the data amount of data for each of the namespaces $NS_0$ to $NS_M$ stored in the input namespaces $INS_0$ to $INS_P$. The configuration unit 14 updates the management data 18 using the result of subtraction.

Here, as a method for selecting the data transfer source block from which the valid data is transferred, the configuration unit 14 may select a block having the oldest write time from the blocks B included in the input namespaces $INS_0$ to $INS_P$ as the data transfer source block.

As a method for selecting a block to which the valid data is transferred, the configuration unit 14 may select a block having the least amount of valid data from the blocks B included in the input namespaces $INS_0$ to $INS_P$ as the data transfer source block. Furthermore, in the present embodiment, a block having a data amount of valid data which is less than a first threshold value may be selected as a block of a data transfer source from the blocks included in the input namespaces $INS_0$ to $INS_P$.

The configuration unit 14 may reduce the number of blocks to be assigned to the input namespaces $INS_0$ to $INS_P$ when the data amount of valid data stored in the data transfer source block selected for data transfer of the valid data is less than a second threshold value. In contrast, the configuration unit 14 may increase the number of blocks to be assigned to the input namespaces $INS_0$ to $INS_P$ when the data amount of the valid data stored in the data transfer source block is greater than a third threshold value.

For example, the configuration unit 14 may select a data transfer source block from the input namespaces $INS_0$ to $INS_P$ when the number of blocks included in the input namespaces $INS_0$ to $INS_P$ is greater than a fourth threshold value. In that case, the write unit 16 transfers the valid data stored in the data transfer target block to the namespaces $NS_0$ to $NS_M$ corresponding to the valid data. Then, the configuration unit 14 reduces the number of blocks included in the input namespaces $INS_0$ to $INS_P$ and increases the number of blocks included in the namespaces $NS_0$ to $NS_M$.

Furthermore, the configuration unit 14 transfers an empty block in which no data is stored from a namespace categorized as pre-garbage collection to the other namespace based on the garbage collection result executed for each of the namespaces $NS_0$ to $NS_M$, and updates the management data 18. Thus, the wear leveling can be performed between the namespaces $NS_0$ to $NS_M$. The assignment change between the namespaces $NS_0$ to $NS_M$ and the blocks $B_0$ to $B_N$ may be performed by the configuration unit 14 observing the data storage conditions of the namespaces $NS_0$ to $NS_M$ based on an observation result as in the time of generation of the management data 18. Or, the assignment change may be performed based on an instruction from the information processing device 2 or an instruction from the manager of the memory system 3. For example, the change of the namespaces $NS_0$ to $NS_M$ are performed to convert the empty block of the namespace with lower data capacity, lower access frequency, lower number of access, or lower data storage ratio to the namespace with higher data capacity, higher access frequency, higher number of access, or higher data storage ratio.

Furthermore, the configuration unit 14 sets provisioning areas $P_0$ to $P_Y$ which are not normally used for each of the namespaces $NS_0$ to $NS_M$ and the input namespaces $INS_0$ to $INS_P$ in the nonvolatile memory 5 based on the configuration command C1 for over provisioning. The setting of the provisioning areas $P_0$ to $P_Y$ may be performed by the configuration unit 14 based on the data capacity of each of the namespaces $NS_0$ to $NS_M$ and the input namespaces $INS_0$ to $INS_P$. Or, the setting may be performed based on an instruction from the information processing device 2, or an instruction from the manager of the memory system 3.

In the present embodiment, the provisioning areas $P_0$ to $P_Y$ are secured in the nonvolatile memory 5; however, they may be secured in any other memory in the memory system 3. For example, the provisioning areas $P_0$ to $P_Y$ may be secured in a memory such as DRAM or SRAM.

When the reception unit 13 receives the write command C2, the address translation unit 15 executes associating to translate the LBA 7 with the write command C2 into the PBA for the address translation table $T_0$ corresponding to the namespace $NS_0$ which indicates the NSID 6 with the write command C2.

For example, the address translation unit 15 associates the LBA 7 with PBA indicated by an empty block within the input namespace $INS_0$ during a write operation and updates the address translation table $T_0$. Furthermore, when the relationship between the LBA 7 and the PBA is changed by the data transfer from the input namespace $INS_0$ to the namespace $NS_0$, the address translation unit 15 associates the LBA 7 with the PBA of the namespace $NS_0$ and updates the address translation table $T_0$.

In the present embodiment, the address translation unit 15 is achieved by the processor 11; however, the address translation unit 15 may be structured separately from the processor 11.

Furthermore, the address translation unit 15 performs the address translation based on the address translation tables $T_0$ to $T_M$; however, the address translation may be performed by a key-value type retrieval. For example, the LBA is set as a key and the PBA is set as a value. Then the address translation by key-value type retrieval can be achieved.

The write unit 16 writes the write data 9 in a position indicated by the PBA in input namespaces $INS_0$ to $INS_P$ obtained from the address translation unit 15, and then, writes the write data 9 in a position indicated by the PBA in the namespaces $NS_0$ to $NS_M$ obtained from the address translation unit 15 from the input namespaces $INS_0$ to $INS_P$.

In the present embodiment, the write unit 16 stores the write data 9 in the buffer memory $F_0$ corresponding to the namespace $NS_0$ indicated by the NSID 6 attached to the write command C2. Next, when the buffer memory $F_0$ reaches the data amount suitable for the input namespace $INS_0$ or the namespace $NS_0$, the write unit 16 writes the data of the buffer memory $F_0$ to the input namespace $INS_0$. Then, based on executing of the garbage collection with respect to the namespace $NS_0$, for example, the write unit 16 transfers the valid data stored in the block of a data transfer source and corresponding to the namespace $NS_0$ to the block of the namespace $NS_0$ related to the valid data. For example, the write unit 16 writes the valid data stored in the input namespace $INS_0$ and corresponding to the namespace $NS_0$ to the namespace $NS_0$ based on executing the garbage collection with respect to the namespace $NS_0$. Note that, the data transfer by the write unit 16 from the input namespace $INS_0$ to the namespace $NS_0$ may be executed at an optional timing.

The garbage collection units $G_0$ to $G_Y$ correspond to the namespaces $NS_0$ to $NS_M$ and the input namespaces $INS_0$ to $INS_P$ and can independently execute the garbage collection in each of the namespaces $NS_0$ to $NS_M$ and input namespaces $INS_0$ to $INS_P$. The garbage collection is a process to release an unnecessary memory area or a process to secure a continuous available memory area by collecting data written in a memory area with gaps. The garbage collection units $G_0$ to $G_Y$ may be configured to execute garbage collections in parallel, or consecutively.

The garbage collection is explained in detail using the garbage collection unit $G_0$ as an example selected from the garbage collection unit $G_0$ to $G_Y$. The garbage collection unit $G_0$ first selects the blocks $B_0$ to $B_2$ corresponding to the namespace $NS_0$ based on the management data 18. Then, the garbage collection unit $G_0$ performs the garbage collection with respect to the selected blocks $B_0$ to $B_2$. Then, based on a result of the garbage collection performed by the garbage collection unit $G_0$, the address translation unit 15 updates the address translation table $T_0$.

Note that, in the present embodiment, the LBAs and the PBAs are associated with each other in the address translation tables $T_0$ to $T_M$. The blocks identifiable by the PBAs and the NISDs are associated with each other in the management data 18. Therefore, when LBA 7 is received and the management data 18 is generated, the namespace $NS_0$ which is a write destination can be specified from the LBA 7 attached to the write command C2 at the processor 11 side. Therefore, after the generation of the management data 18, attaching the NSID 6 to the write command C2 can be omitted, and the NSID 6 may be acquired at the processor 11 side based on the LBA 7, address translation tables $T_0$ to $T_M$, and management data 18.

FIG. 2 is a block diagram showing an example of a relationship between LBA spaces, the namespaces $NS_0$ to $NS_M$, the address translation tables $T_0$ to $T_M$, the garbage collection units $G_0$ to $G_M$, and the management data 18.

LBA spaces $A_0$ to $A_M$ of the information processing device 2 are assigned to the namespaces $NS_0$ to $NS_M$, respectively.

The LBA space $A_0$ includes logical addresses 0 to $E_0$. The LBA space $A_1$ includes logical addresses 0 to $E_1$. The LBA space $A_M$ includes logical addresses 0 to $E_M$. Other LBA spaces $A_2$ to $A_{M-1}$ include a plurality of logical addresses similarly.

In the following description, the LBA space $A_0$ and the namespace $NS_0$ assigned to the LBA space $A_0$ are explained representatively for the sake of simplification. However, other LBA spaces $A_1$ to $A_M$ and namespaces $NS_1$ to $NS_M$ are structured the same.

When writing the data of the LBA space $A_0$ to the nonvolatile memory 5, the information processing device 2 sends the write command C2, NSID 6 indicating the namespace $NS_0$ corresponding to the LBA space $A_0$, LBA 7 within LBA space $A_0$, data size 8, and write data 9 corresponding to the LBA 7 to the memory system 3.

The management data 18 associates the namespace $NS_0$ with the blocks $B_0$ to $B_2$.

The garbage collection unit $G_0$ performs the garbage collection with respect to the blocks $B_0$ to $B_2$ included in the namespace $NS_0$ corresponding to the garbage collection unit $G_0$ based on the management data 18.

As a result of the garbage collection, data arrangement will be changed within the blocks $B_0$ to $B_2$. Therefore, the garbage collection unit $G_0$ instructs the address translation unit 15 which is omitted in FIG. 2 to perform the update of address translation table $T_0$. The address translation unit 15 updates the address translation table $T_0$ corresponding to the namespace $NS_0$ to match the data arrangement after the garbage collection.

FIG. 3 is a flowchart showing an example of a process performed by the reception unit 13 and the configuration unit 14 according to the present embodiment.

In step S301, the reception unit 13 receives the configuration command C1 of the namespaces $NS_0$ to $NS_M$.

In step S302, the configuration unit 14 generates the management data 18 including various data such as data of the namespaces $NS_0$ to $NS_M$ assigned to the blocks $B_0$ to $B_N$, data of the input namespaces $INS_0$ to $INS_P$ assigned to the blocks B, data of the namespaces $NS_0$ to $NS_M$ assigned to the input namespaces $INS_0$ to $INS_P$, and data indicative of a relationship between data stored in the input namespace $INS_0$ to $INS_P$ and the namespaces $NS_0$ to $NS_M$ corresponding to the data.

In step S303, the configuration unit 14 stores the management data 18 in the memory 12.

In step S304, the configuration unit 14 determines whether or not the management data 18 is updated. For example, the configuration unit 14 determines the management data 18 is updated when the data is moved from the input namespaces $INS_0$ to $INS_P$ to the namespaces $NS_0$ to $NS_M$ based on executing of the garbage collection.

When the management data 18 is not updated, the process moves to step S307.

When the management data 18 is updated, the configuration unit 14 updates the management data 18 in step S305.

In step S306, the configuration unit 14 stores the updated management data 18 in the memory 12.

In step S306, the configuration unit 14 determines whether or not the process is continued.

When the process is continued, the process is moved to step S304.

When the process is not continued, the process is terminated.

FIG. 4 is a flow chart showing an example of a process performed by the garbage collection unit $G_0$ and the address translation unit 15 according to the present embodiment. Note that the same process is executed in the other garbage collection units $G_1$ to $G_M$. The process shown in FIG. 4 may be performed based on an instruction from the information processing device 2, for example. Or, the process may be performed based on an instruction from the manager of the memory system 3. Furthermore, the garbage collection unit $G_0$ may execute the process of FIG. 4 voluntarily by, for example, observing the data storage condition of the namespace $NS_0$ of the garbage collection target and determining the start of the garbage collection appropriately. More specifically, the garbage collection unit $G_0$ executes the garbage collection with respect to the namespace $NS_0$ when the number of empty blocks within the namespace $NS_0$ is a predetermined number or less, or when a ratio of empty blocks to the whole blocks within the namespace $NS_0$ is a predetermined value or less.

In step S401, the garbage collection unit $G_0$ selects the blocks $B_0$ to $B_2$ corresponding to the namespace $NS_0$ which is the garbage collection target based on the management data 18.

In step S402, the garbage collection unit $G_0$ executes the garbage collection with respect to the blocks $B_0$ to $B_2$ within the selected namespace $NS_0$. Based on executing of the garbage collection, the write unit 16 transfers the data from the input namespace $INS_0$ to the namespace $NS_0$.

In step S403, the address translation unit 15 updates the address translation table $T_0$ corresponding to the namespace $NS_0$ which is the garbage collection target based on the conditions of the blocks $B_0$ to $B_2$ and the conditions of the blocks B of the input namespace $INS_0$ after the garbage collection.

In the present embodiment explained as above, a predetermined block amount or a block amount set by the information processing device 2 can be assigned to each of the namespaces $NS_0$ to $NS_M$, and the data corresponding to the namespaces $NS_0$ to $NS_M$ can be written to the blocks $B_0$ to $B_M$ assigned to the namespaces $NS_0$ to $NS_M$, and different data amounts can be set to the namespaces $NS_0$ to $NS_M$.

In the present embodiment, the data stored in the input namespaces $INS_0$ to $INS_P$ can be moved to the namespaces $NS_0$ to $NS_M$ at any optional timing such as garbage collection execution.

In the present embodiment, based on the management data 1, to which namespace of the namespaces $NS_0$ to $NS_M$ each data stored in the input namespaces $INS_0$ to $INS_P$ is related can be recognized.

In the present embodiment, when the data is written to the input namespaces $INS_0$ to $INS_P$, a data amount of data corresponding to the namespaces $NS_0$ to $NS_M$ related to the data stored in the input namespaces $INS_0$ to $INS_P$ is calculated. Furthermore, the number of blocks corresponding to the calculated data amount is subtracted form the number of the blocks $B_0$ to $B_N$ assigned to the namespaces $NS_0$ to $NS_M$.

Therefore, by storing the data in the input namespaces $INS_0$ to $INS_P$ before storing the data in the namespaces $NS_0$ to $NS_M$, the number of blocks to be assigned to namespaces $NS_0$ to $NS_M$ can be reduced, and the allocation of the namespaces $NS_0$ to $NS_M$ can be performed efficiently."

"In the present embodiment, a block of a data transfer source can be selected from the blocks B included in the input namespaces $INS_0$ to $INS_P$, and the valid data stored in the data transfer source block can be transferred to a block of the namespace corresponding to the valid data. In that case, a data amount of valid data corresponding to the namespaces $NS_0$ to $NS_M$ included in the data transfer source block is subtracted from the data amount of each of the namespaces $NS_0$ to $NS_M$ related to data stored in the input namespaces $INS_0$ to $INS_P$.

Therefore, even if the data is transferred from the input namespaces $INS_0$ to $INS_P$ to the namespaces $NS_0$ to $NS_M$, the data amount of data corresponding to the namespaces $NS_0$ to $NS_M$ and stored in the input namespaces $INS_0$ to $INS_P$ can be recognized.

In the present embodiment, old data can be transferred from the input namespaces $INS_0$ to $INS_P$ to the namespaces $NS_0$ to $NS_M$.

In the present embodiment, for example, a block having less valid data can be selected from the input namespaces $INS_0$ to $INS_P$, and the valid data of the selected block can be moved to the namespaces $NS_0$ to $NS_M$. Furthermore, in the present embodiment, for example, from the blocks included in the input namespaces $INS_0$ to $INS_P$, a block having a data amount of valid data which is less than the first threshold value can be selected as a block of a data transfer source.

Therefore, a data amount of the data transferred from the input namespaces $INS_0$ to $INS_P$ to the namespaces $NS_0$ to $NS_M$ can be suppressed and the performance loss of the memory system 3 can be prevented.

In the present embodiment, when a data amount of the valid data of a block selected for the valid data transfer is less than a second value, the number of blocks assigned to the input namespaces $INS_0$ to $INS_P$ can be reduced. Furthermore, in the present embodiment, When a data amount of the valid data of a block selected for the valid data transfer is greater than a third threshold value, the number of blocks assigned to the input namespaces $INS_0$ to $INS_P$ can be increased.

Therefore, the number of blocks assigned to the input namespaces $INS_0$ to $INS_P$ can be set suitably.

In the present embodiment, when the number of blocks included in the input namespaces $INS_0$ to $INS_P$ is greater than a fourth threshold value, the configuration unit 14 selects a block from the input namespaces $INS_0$ to $INS_P$, and the valid data stored in the selected block selected is transferred to the namespaces $NS_0$ to $NS_M$ corresponding to the valid data by the write unit 16. Then, in the present embodiment, the configuration unit 14 reduces the number of blocks included in the input namespaces $INS_0$ to $INS_P$ and increases the number of blocks included in the namespaces $NS_0$ to $NS_M$.

Therefore, since the size of the input namespaces $INS_0$ to $INS_P$ is enlarged, a shortage of the namespaces $NS_0$ to $NS_M$ can be prevented.

In the present embodiment, a data writing position of the namespaces $NS_0$ to $NS_M$ can be designated. In the present embodiment, the garbage collection can be performed in each of the namespaces $NS_0$ to $NS_M$ and the input namespaces $INS_0$ to $INS_P$ independently and efficiently.

In the present embodiment, as a result of the garbage collection, the empty block which do not store data can be transferred from the namespace before the garbage collection to the other namespace, and the empty block can be secured within the other namespace. Therefore, the namespace to be assigned to the block can be changed, the wear leveling can be performed between the namespaces $NS_0$ to $NS_M$, and the life of the nonvolatile memory 5 can be prolonged.

In the present embodiment, the provisioning areas $P_0$ to $P_M$ having different data amounts can be set in each of the namespaces $NS_0$ to $NS_M$, and the over provisioning can be achieved in each of the namespaces $NS_0$ to $NS_M$. Thus, the write speed can be accelerated and performance can be maintained, and consequently, the reliability can be improved.

In the present embodiment, the address translation tables $T_0$ to $T_M$ are managed for each of the namespaces $NS_0$ to $NS_M$, and the address translation and changing of the relationship between the LBA and PBA can be performed efficiently in each of the namespaces $NS_0$ to $NS_M$.

In the present embodiment, if the address translation is performed by the key-value type retrieval, even the data volume of the nonvolatile memory 5 is large, the address translation can be performed efficiently.

In the present embodiment, highly sophisticated memory management can be achieved in each of the namespaces $NS_0$ to $NS_M$, the life of the nonvolatile memory 5 can be prolonged, the production costs can be reduced, and write/read processes to/from the nonvolatile memory 5 divided by the namespaces $NS_0$ to $NS_M$ can be rapid.

In the present embodiment, a compaction unit of each of the namespaces $NS_0$ to $NS_M$ and the input namespaces $INS_0$ to $INS_P$ may be provided instead of or together with garbage collection units $G_0$ to $G_Y$. The compaction unit corresponding to each of the namespaces $NS_0$ to $NS_M$ and the input namespaces $INS_0$ to $INS_P$ executes compaction with respect to each of the namespaces $NS_0$ to $NS_M$ and the input namespaces $INS_0$ to $INS_P$ based on the management data 18.

In the present embodiment, the communication of configuration command C1 between, for example, the information processing device 2 and the memory system 3 may be omitted. For example, the address translation unit 15 may include a part of or the whole functions of the configuration unit 14. For example, the address translation unit 15 may generate the management data 18 and address translation tables $T_0$ to $T_M$ of the namespaces $NS_0$ to $NS_M$ by associating the NSID 6 and LBA 7 added to the write command C2 with the PBA corresponding to the LBA 7. The management data 18 and the address translation tables $T_0$ to $T_M$ may be coupled or divided arbitrarily. The structure in which the communication of the configuration command C1 is omitted and the address translation unit 15 includes a part of or the whole functions of the configuration unit 14 is explained in detail in the following second embodiment.

Second Embodiment

In the present embodiment, explained is an information processing system in which a memory system writes write data from a plurality of information processing devices and sends the read data to the information processing devices.

Figure 5:
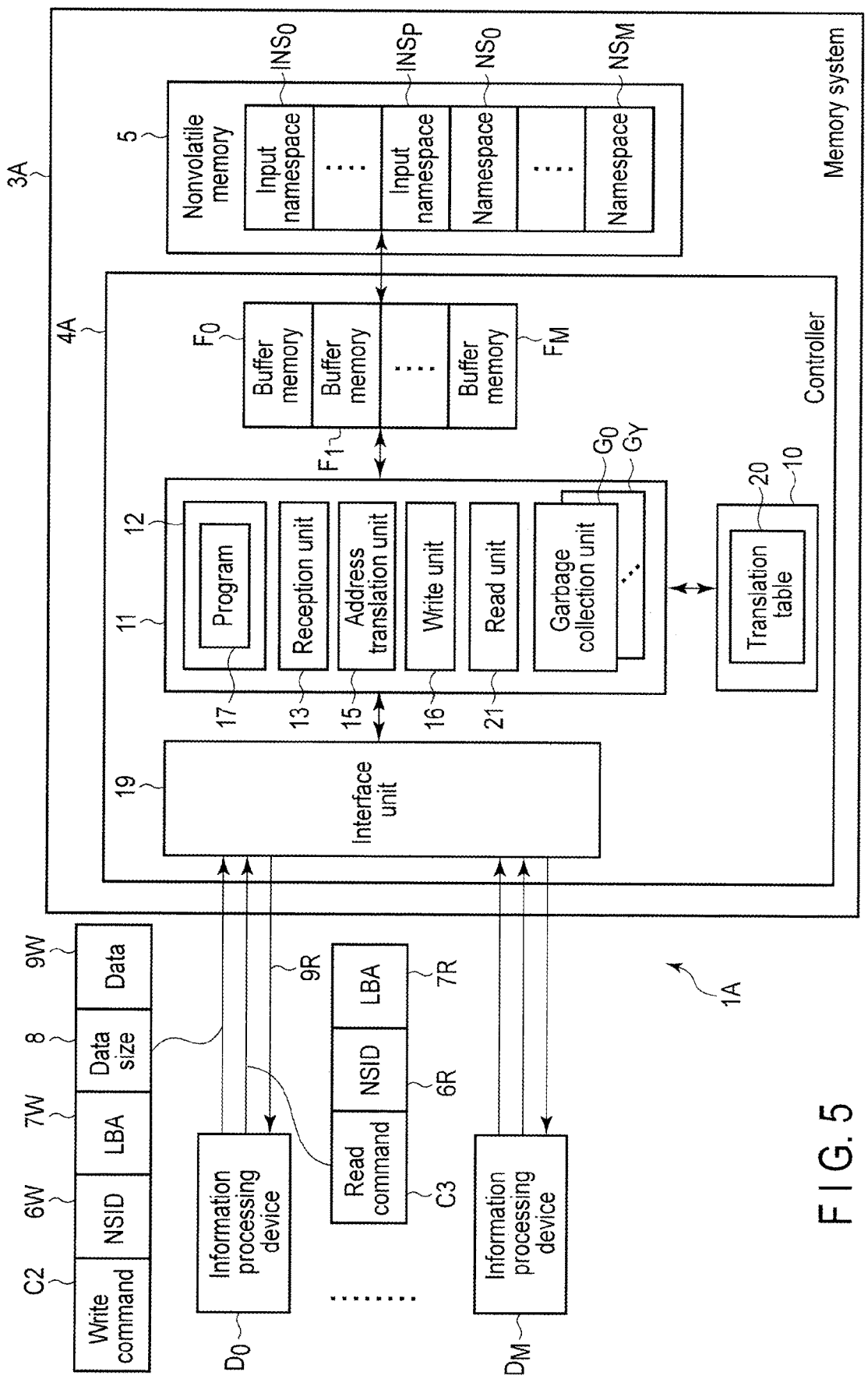
FIG. 5 is a block diagram showing an example of a structure of an information processing system of a second embodiment.

FIG. 5 is a block diagram showing an example of a structure of an information processing system of the present embodiment.

The information processing system 1A includes a plurality of information processing devices $D_0$ to $D_M$ and a memory system 3A. Each of the information processing devices $D_0$ to $D_M$ functions similarly to the information processing device 2. The memory system 3A differs from the above memory system 3 mainly because it includes a translation table (translation data) 20 instead of the address translation tables $T_0$ to $T_M$ and management data 18, it transmits/receives data, information, signal, and command to/from the information processing devices $D_0$ to $D_M$, and the address translation unit 15 functions as the configuration unit 14. In the present embodiment, differences from the first embodiment are explained, and the same explanation or substantially the same explanation may be omitted or simplified.

The memory system 3A included in, for example, a cloud computing system. In the present embodiment, a case where the memory system 3A is shared with the information processing devices $D_0$ to $D_M$ is exemplified; however, it may be shared with a plurality of users. At least one of the information processing devices $D_0$ to $D_M$ may be a virtual machine.

In the present embodiment, NSID added to a command is used as an access key to the namespaces.

In the present embodiment, the information processing devices $D_0$ to $D_M$ have access rights to their corresponding namespaces $NS_0$ to $NS_M$. However, only a single information processing devices may have access rights to one or more namespaces, or a plurality of information processing devices may have an access right to a common namespace.

Each of the information processing devices $D_0$ to $D_M$ transfers, together with a write command C2, an NSID 6W indicative of its corresponding write destination space, LBA 7W indicative of the write destination, data size 8, and write data 9W to the memory system 3A.

Each of the information processing devices $D_0$ to $D_M$ transfers, together with a write command C3, an NSID 6R indicative of its corresponding read destination space, and LBA 7R indicative of the read destination to the memory system 3A.

Each of the information processing devices $D_0$ to $D_M$ receives read data 9R corresponding to a read command C3 or data indicative of a read error from the memory system 3A.

The memory system 3A includes a controller 4A and a nonvolatile memory 5.

The controller 4A includes an interface unit 19, memory unit 10, buffer memory $F_0$ to $F_M$, and processor 11. In the present embodiment, the number of processor 11 in the controller 4A can be changed optionally to be one or more.

The interface unit 19 transmits/receives data, information, signal, and command to/from an external device such as the information processing devices $D_0$ to $D_M$.

The memory unit 10 stores a translation table 20. A part of or the whole translation table 20 may be stored in a different memory such as a memory 12.

The translation table 20 is data which associates the LBA, PBA, NSID, data size, information indicative of whether or not data is stored in the input namespaces (hereinafter referred to as an input flag) with each other. The translation table 20 is explained later with reference to FIG. 6.

The buffer memories $F_0$ to $F_M$ are used for write buffer memories and read buffer memories with respect to namespaces $NS_0$ to $NS_M$.

The processor 11 includes a memory 12 storing the program 17, reception unit 13, address translation unit 15, write unit 16, read unit 21, and garbage collection units $G_0$ to $G_Y$. When the program 17 is executed, the processor 11 functions as the reception unit 13, address translation unit 15, write unit 16, read unit 21, and garbage collection units $G_0$ to $G_Y$.

The reception unit 13 receives, at the time of data write, the write command C2, NSID 6W, LBA 7W, data size 8, and write data 9W from the information processing devices $D_0$ to $D_M$ through the interface unit 19.

The reception unit 13 receives, at the time of data read, the read command C3, NSID 6R, and LBA 7R from the information processing devices $D_0$ to $D_M$ through the interface unit 19.

When the reception unit 13 receives the write command C2, based on the LBA 7W and NSID 6W added to the write command C2, the address translation unit 15 determines the PBA of the write destination in the input namespace corresponding to the namespace indicated by NSID 6W. The address translation unit 15 then updates the translation table 20 associating the LBA 7W, NSID 6W, determined PBA in the input namespace, data size, and the input flag Y which indicates data storage in the input namespace with each other.

When data is transferred from the input namespace to the namespace, the address translation unit 15 determines the PBA of the write destination in the namespace and updates the translation table 20 associating the LBA 7W, NSID 6W, determined PBA in namespace, data size, and the input flag N which indicates no data storage in the input namespace with each other.

When the read command C3 is received by the reception unit 13, based on the LBA 7R and NSID 6R added to the read command C3, and the translation table 20, the address translation unit 15 determines the PBA of the read destination in the namespace indicated by NSID 6R or in the input namespace corresponding to the namespace indicated by NSID 6R.

The write unit 16 writes the write data 9W at a position indicated by the PBA in the input namespace corresponding to the namespace indicated by NSID 6W via a buffer memory corresponding to the namespace indicated by NSID 6W. Then, the write unit 16 writes the write data 9W at a position indicated by the PBA in the namespace indicated by NSID 6W obtained by the address translation unit 15 from the input namespace.

The read unit 21 reads the read data 9R from the position indicated by the PBA in the namespace indicated by NSID 6R or a position of PBA in the input namespace corresponding to the namespace via the buffer memory corresponding to the namespace indicated by NSID 6W. Then, the read unit 21 sends the read data 9R to the information processing devices issuing the read commend C3 via the interface unit 19.

In the present embodiment, the garbage collection units $G_0$ to $G_Y$ execute garbage collection of each of the namespaces $NS_0$ to $NS_M$ and the input namespaces $INS_0$ to $INS_P$ based on the translation table 20.

FIG. 6 is a data structural diagram showing an example of the translation table 20 according to the present embodiment.

The translation table 20 manages the LBA, PBA, NSID, data size, and input flag while associating them with each other. For example, the translation table 20 associates the LBA 200, PBA 300, $NS_0$, data size Z, and input flag N which indicates that no data is stored in the input namespace with each other. For example, the translation table 20 associates the LBA 201, PBA 301, $NS_0$, data size Z, and input flag Y which indicates that the data is stored in the input namespace with each other. For example, the translation table 20 associates the LBA 200, PBA 399, $NS_M$, data size Z, and input flag N which indicates that no data is stored in the input namespace with each other.

In the present embodiment, the translation table 20 manages the data size. However, when the data size is constant, the data size may be deleted from the translation table 20. When the data size is constant, the data amount of the valid data of each block B and $B_0$ to $B_N$ may be recognized based on the number of valid data in each block B of the input namespaces $INS_0$ to $INS_P$ and each of blocks $B_0$ to $B_N$ of the namespaces $NS_0$ to $NS_M$.

In the present embodiment, the translation table 20 manages the input flag. However, since the PBA identifies in which space the data is stored between the input namespaces $INS_0$ to $INS_P$ and the namespaces $NS_0$ to $NS_M$, the input flag may be omitted from the translation table 20.

The address translation unit 15 determines the PBA such that the PBA 300 associated with the LBA 200 and the NSID indicative of the namespace $NS_0$ and PBA 399 associated with the LBA 200 and the NSID indicative of the namespace $NS_M$ differ from each other.

Thus, the address translation unit 15 can select PBA 300 when the NSID received with the LBA 200 indicates the namespace $NS_0$ and select PBA 399 when the NSID received with the LBA 200 indicates the namespace $NS_M$.

Therefore, even if the same logical address is used between a plurality of information processing devices $D_0$ to $D_M$, the memory system 3A can be shared with the information processing devices $D_0$ to $D_M$.

FIG. 7 is a flowchart showing an example of a first write process of the memory system 3A according to the present embodiment.

As to FIG. 7, the explanation thereof is presented given that the write command C2 is issued from the information processing device $D_0$ amongst the information processing devices $D_0$ to $D_M$, and the NSID 6W which indicates the namespace $NS_0$ is added to the write command C2. However, the process is performed similarly when the write commend C2 is issued from any of the information processing devices $D_1$ to $D_M$. Furthermore, the process is performed similarly when the NSID 6W which indicates any of the other namespaces $NS_1$ to $NS_M$ is added to the write command C2.

In step S701, the reception unit 13 receives the write command C2, NSID 6W, LBA 7W, data size 8, and write data 9W from the information processing device $D_0$ via the interface unit 19.

In step S702, when the write command C2 is received by the reception unit 13, based on the LBA 7W and NSID 6W added to the write command C2, the address translation unit 15 determines the PBA of a write destination in the input namespace $INS_0$ corresponding to the namespace $NS_0$ indicated by the NSID 6W.

In step S703, the address translation unit 15 updates the translation table 20 associating the LBA 7W, NSID 6W, determined PBA, data size Z, and input flag Y which indicates data storage in the input namespace with each other.

In step S704, the write unit 16 writes the write data 9W at a position indicated by the PBA in the input namespace $INS_0$ corresponding to the namespace $NS_0$ indicated by the NSID 6W via the buffer memory $F_0$ corresponding to the namespace $NS_0$ indicated by the NSID 6W.

Figure 8:
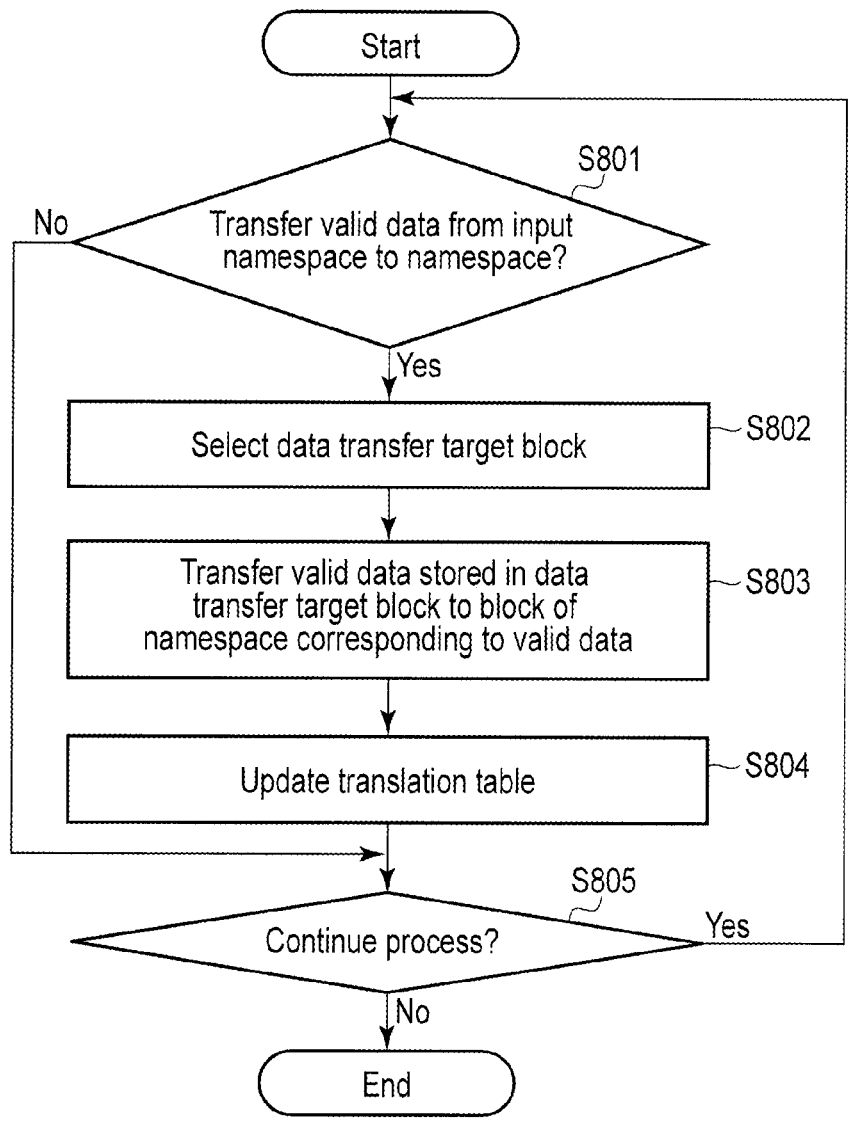
FIG. 8 is a flowchart showing an example of a second write process of the memory system according to the second embodiment.

FIG. 8 is a flowchart showing an example of a second write process of the memory system 3A according to the present embodiment.

As to FIG. 8, the explanation thereof is presented given that valid data is transferred from the input namespace $INS_0$ to the namespace $NS_0$. However, the process is performed similarly when the valid data is transferred from the input namespaces $INS_1$ to $INS_P$ to the namespaces $NS_0$ to $NS_M$.

In step S801, the write unit 16 determines, for example, based on whether or not garbage collection is performed, to determine whether or not the valid data is transferred from the input namespace $INS_0$ to the namespace $NS_0$.

When the valid data is not determined to be transferred, the process proceeds to step S805.

When the valid data is determined to be transferred, the address translation unit 15 selects a data transfer source block from blocks B included in the input namespace $INS_0$ in step S802.

In step S803, the write unit 16 transfers the valid data stored in the data transfer source block to the block of the namespace $NS_0$ corresponding the valid data.

In step S804, the address translation unit 15 updates the translation table 20 associating the LBA corresponding to the valid data, the PBA in the namespace $NS_0$, the NSID which indicates the namespace $NS_0$, the data size Z, and the input flag N which indicates no data is stored in the input namespace with each other.

In step S805, whether or not the second write process is continued is determined.

When the second write process is continued, the second write process goes back to step S801.

When the second write process is not continued, it is terminated.

Figure 9:
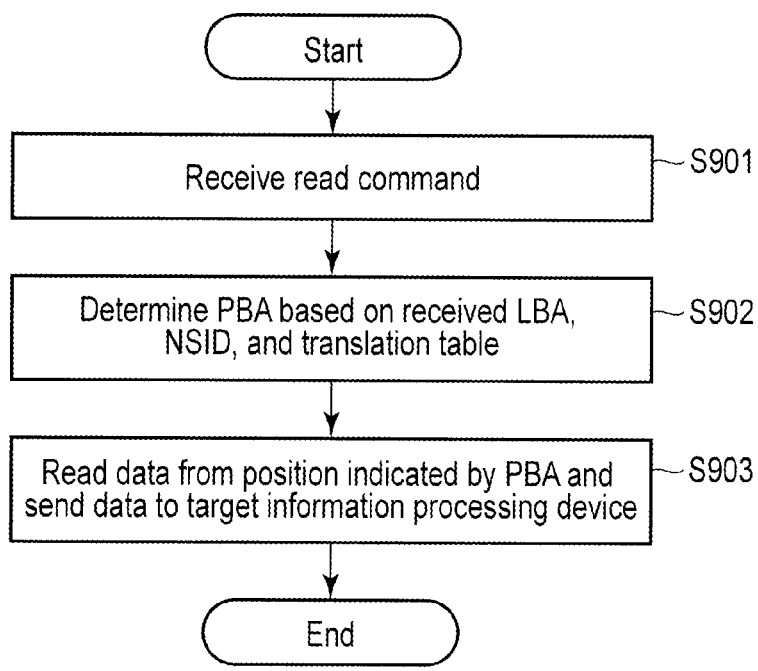
FIG. 9 is a flowchart showing an example of a read process of the memory system of the second embodiment.

FIG. 9 is a flowchart showing an example of a read process of the memory system 3A according to the present embodiment.

As to FIG. 9, the explanation is presented given that the read command C3 is issued from information processing device DM amongst information processing devices $D_0$ to $D_M$, and the NSID 6R which indicates the namespace $NS_M$ is added to the read command C3. However, the process is performed similarly when the read commend C3 is issued from any of the information processing devices $D_1$ to $D_{M-1}$. Furthermore, the process is performed similarly when the NSID 6R which indicates any of the other namespaces $NS_1$ to $NS_{M-1}$ is added to the read command C3.

In step S901, the reception unit 13 receives the read command C3, NSID 6R, and LBA 7R from the information processing device $D_M$ via the interface unit 19.

In step S902, when the read command C3 is received by the reception unit 13, based on the LBA 7R and NSID 6R added to the read command C3, and translation table 20, the address translation unit 15 determines the PBA of a read destination in the input namespace $INS_P$ or in the namespace $NS_M$.

In step S903, the read unit 21 reads the read data 9R from the position indicated by the PBA in the namespace $NS_M$ indicated by the NSID 6R or in the input namespace $INS_P$ corresponding to the namespace $NS_M$ via the buffer memory FM corresponding to the namespace $NS_M$ indicated by the NSID 6R, and sends the read data 9R to the information processing device DM issuing the read command C3 via the interface unit 19.

In the present embodiment described above, the nonvolatile memory 5 is divided into a plurality of the input namespaces $INS_0$ to $INS_P$ and the namespaces $NS_0$ to $NS_M$. Amongst the input namespaces $INS_0$ to $INS_P$ and namespaces $NS_0$ to $NS_M$, the information processing devices $D_0$ to $D_M$ can access the namespaces whose access rights are granted thereto. Consequently, data security can be improved.

The controller 4A of the memory system 3A controls the input namespaces $INS_0$ to $INS_P$ and namespaces $NS_0$ to $NS_M$ independently space by space. Therefore, conditions of use can be changed between the input namespaces $INS_0$ to $INS_P$ and the namespaces $NS_0$ to $NS_M$ uniquely space by space.

The memory system 3A associates the LBA, PBA, and NSID with each other, and thus, even if the same LBA sent from a plurality of independent information processing devices is received, the data can be distinguished based on the NSID.

In each of the above embodiments, data in a table format can be implemented as a different data structure such as a list format.

Third Embodiment

In the present embodiment, the information processing systems 1 and 1A explained in the first and second embodiments are further explained in detail.

FIG. 10 is a block diagram showing of an example of a detail structure of the information processing system 1 according to the present embodiment.

In FIG. 10, the information processing system 1B includes an information processing device 2B and a memory system 3B. The information processing system 1B may include a plurality of information processing devices as in the second embodiment. That is, the information processing devices 2 and D0 to DM of the first and second embodiments correspond to the information processing devices 2B.

The memory systems 3 and 3A according to the first and second embodiments correspond to the memory system 3B.

the processor 11 of the first and second embodiments corresponds to CPU 43F and 43B.

The address translation tables $T_0$ to $T_M$ according to the first embodiment and the translation table 20 of the second embodiment correspond to a LUT 45.

The memory unit 10 of the first and second embodiments corresponds to a DRAM 47.

The interface unit 19 according to the second embodiment corresponds to a host interface 41 and a host interface controller 42.

The buffer memories $F_0$ to $F_M$ of the first and second embodiments correspond to a write buffer WB and read buffer RB.

The information processing device 2B functions as a host device.

The controller 4 includes a front end 4F and a back end 4B.

The front end (host communication unit) 4F includes a host interface 41, host interface controller 42, encode/decode unit 44, and CPU 43F.

The host interface 41 communicates with the information processing device 2B to exchange requests (write command, read command, erase command), LBA, and data.

The host interface controller (control unit) 42 controls the communication of the host interface 41 based on the control of the CPU 43F.

The encode/decode unit (advanced encryption standard (AES)) 44 encodes the write data (plaintext) transmitted from the host interface controller 42 in a data write operation. The encode/decode unit 44 decodes encoded read data transmitted from the read buffer RB of the back end 4B in a data read operation. Note that the transmission of the write data and read data can be performed without using the encode/decode unit 44 as occasion demands.

The CPU 43F controls the above components 41, 42, and 44 of the front end 4F to control the whole function of the front end 4F.

The back end (memory communication unit) 4B includes a write buffer WB, read buffer RB, LUT unit 45, DDRC 46, DRAM 47, DMAC 48, ECC 49, randomizer RZ, NANDC 50, and CPU 43B.

The write buffer (write data transfer unit) WB stores the write data transmitted from the information processing device 2B temporarily. Specifically, the write buffer WB temporarily stores the write data until it reaches to a predetermined data size suitable for the nonvolatile memory 5.

The read buffer (read data transfer unit) RB stores the read data read from the nonvolatile memory 5 temporarily. Specifically, the read buffer RB rearranges the read data to be the order suitable for the information processing device 2B (the order of the logical address LBA designated by the information processing device 2B).

The LUT 45 is a data to translate the logical address LBA into a predetermined physical address PBA.

The DDRC 46 controls double data rate (DDR) in the DRAM 47.

The DRAM 47 is a nonvolatile memory which stores, for example, the LUT 45.

The direct memory access controller (DMAC) 48 transfers the write data and the read data through an internal bus IB. In FIG. 10, only a single DMAC 48 is shown; however, the controller 4 may include two or more DMACs 48. The DMAC 48 may be set in various positions inside the controller 4.

The ECC (error correction unit) 49 adds an error correction code (ECC) to the write data transmitted from the write buffer WB. When the read data is transmitted to the read buffer RB, the ECC 49, if necessary, corrects the read data read from the nonvolatile memory 5 using the added ECC.

The randomizer RZ (or scrambler) disperses the write data in such a manner that the write data are not biased in a certain page or in a word line direction of the nonvolatile memory 5 in the data write operation. By dispersing the write data in this manner, the number of write can be standardized and the cell life of the memory cell MC of the nonvolatile memory 5 can be prolonged. Therefore, the reliability of the nonvolatile memory 5 can be improved. Furthermore, the read data read from the nonvolatile memory 5 passes through the randomizer RZ in the data read operation.

The NAND controller (NANDC) 50 uses a plurality of channels (four channels CH0 to CH3 are shown in the Figure) to access the nonvolatile memory 5 in parallel in order to satisfy a demand for a certain speed.

The CPU 43B controls each component above (45 to 50, and RZ) of the back end 4B to control the whole function of the back end 4B.

Note that the structure of the controller 4 shown in FIG. 10 is an example and no limitation is intended thereby.

Figure 11:
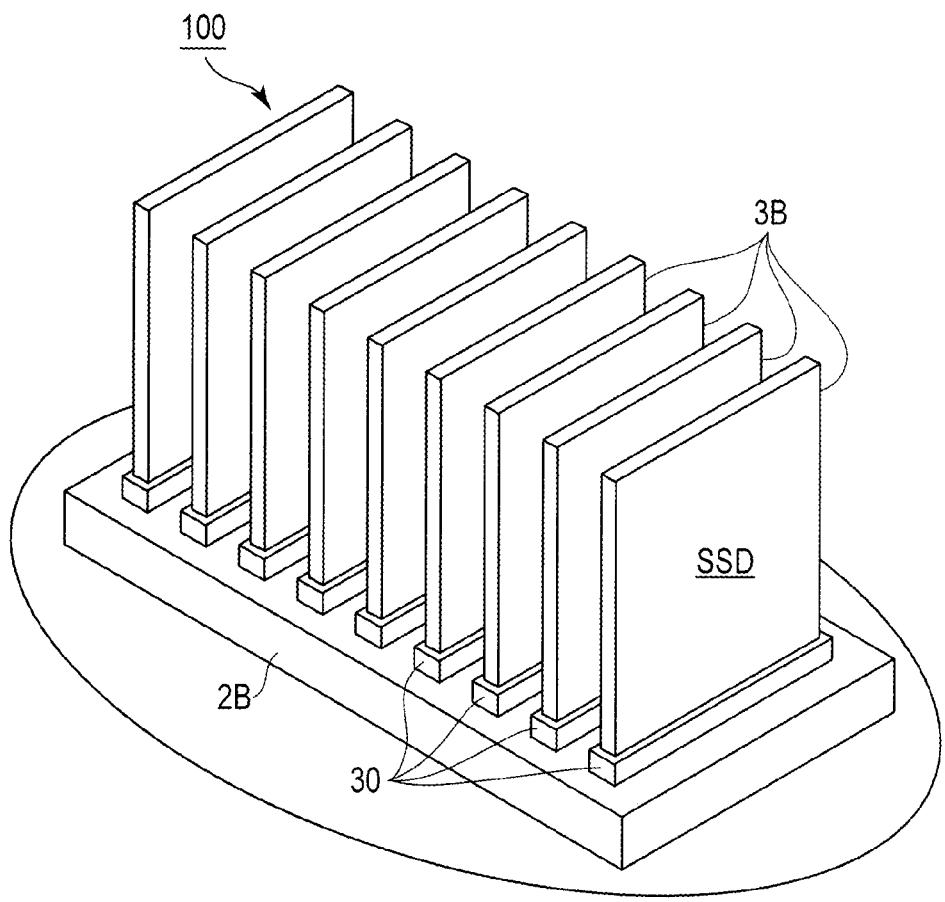
FIG. 11 is a perspective view showing a storage system according to the third embodiment.

FIG. 11 is a perspective view showing a storage system according to the present embodiment.

The storage system 100 includes the memory system 3B as an SSD.

The memory system 3B is, for example, a relatively small module of which external size will be approximately 20 mm×30 mm. Note that the size and scale of the memory system 3B is not limited thereto and may be changed into various sizes arbitrarily.

Furthermore, the memory system 3B may be applicable to the information processing device 2B as a server used in a data center or a cloud computing system employed in a company (enterprise) or the like. Thus, the memory system 3B may be an enterprise SSD (eSSD).

The memory system 3B includes a plurality of connectors (for example, slots) 30 opening upwardly, for example. Each connector 30 is a serial attached SCSI (SAS) connector or the like. With the SAS connector, a high speed mutual communication can be established between the information processing device 2B and each memory system 3B via a dual port of 6 Gbps. Note that, the connector 30 may be a PCI express (PCIe) or NVM express (NVMe).

A plurality of memory systems 3B are individually attached to the connectors 30 of the information processing device 2B and supported in such an arrangement that they stand in an approximately vertical direction. Using this structure, a plurality of memory systems 3B can be mounted collectively in a compact size, and the memory systems 3B can be miniaturized. Furthermore, the shape of each memory system 3B of the present embodiment is 2.5 inch small form factor (SFF). With this shape, the memory system 3B can be compatible with an enterprise HDD (eHDD) and the easy system compatibility with the eHDD can be achieved.

Note that the memory system 3B is not limited to the use in an enterprise HDD. For example, the memory system 3B can be used as a memory medium of a consumer electronic device such as a notebook portable computer or a tablet terminal.

As can be understood from the above, the information processing system 1B and the storage system 100 having the structure of the present embodiment can achieve a mass storage advantage with the same advantages of the first and second embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory that corresponds to a plurality of namespaces including a first namespace, a second namespace, and an input namespace, the input namespace corresponding to the first namespace and the second namespace; and a controller that includes a buffer memory corresponding to the first namespace and configured to:

receive a write command, identifier corresponding to the first namespace, and write data;

write, based on the identifier, the write data to the buffer memory, then write the write data in the buffer memory to the input namespace, and then write the write data in the input namespace to the first name space;

observe data storage conditions of the input namespace, the first namespace, and the second namespace; and change a relationship between erase unit areas included in the nonvolatile memory and the namespaces, based on the data storage conditions.

2. The memory system of claim 1, wherein the controller is configured to:

write valid data corresponding to the identifier in the input namespace to the first namespace corresponding to the identifier.

3. The memory system of claim 2, wherein the controller is further configured to:

execute garbage collection for the first namespace and the second namespace individually; and write, when the garbage collection is executed for the first namespace corresponding to the identifier, the valid data corresponding to the identifier in the input namespace to the first namespace.

4. The memory system of claim 1, wherein the controller is further configured to: manage management data that includes the relationship, and update the management data based on a result of changing the relationship.

5. The memory system of claim 4, wherein the controller further includes a memory, and the management data is stored in the memory.

6. The memory system of claim 4, wherein the controller is further configured to: generate the management data further including a relationship between data stored in the input namespace, and the first namespace or the second namespace corresponding to the data.

7. The memory system of claim 1, wherein the plurality of namespaces further include a third namespace and a fourth namespace, the input namespace includes a first input namespace and a second input namespace, the first input namespace corresponds to the first namespace and the second namespace, the second input namespace corresponds to the third namespace and the fourth namespace, the controller is further configured to:

write, based on the identifier, the write data to the buffer memory, then write the write data in the buffer memory to the first input namespace, and then write the write data in the first input namespace to the first namespace; and observe data storage conditions of the first input namespace and the second input namespace and the first to fourth namespaces; and change the relationship based on the data storage conditions.

8. The memory system of claim 7, wherein the controller is configured to:

write valid data corresponding to the identifier in the first input namespace to the first namespace corresponding to the identifier.

9. The memory system of claim 7, wherein the controller is further configured to:

manage management data including the relationship, and update the management data based on a result of changing the relationship.

* * * * *